Mar. 13, 1923.
H. R. HARDING.
MACHINE FOR SKINNING AND CORING TOMATOES.
FILED SEPT. 12, 1922.
1,448,532.
11 SHEETS—SHEET 1.
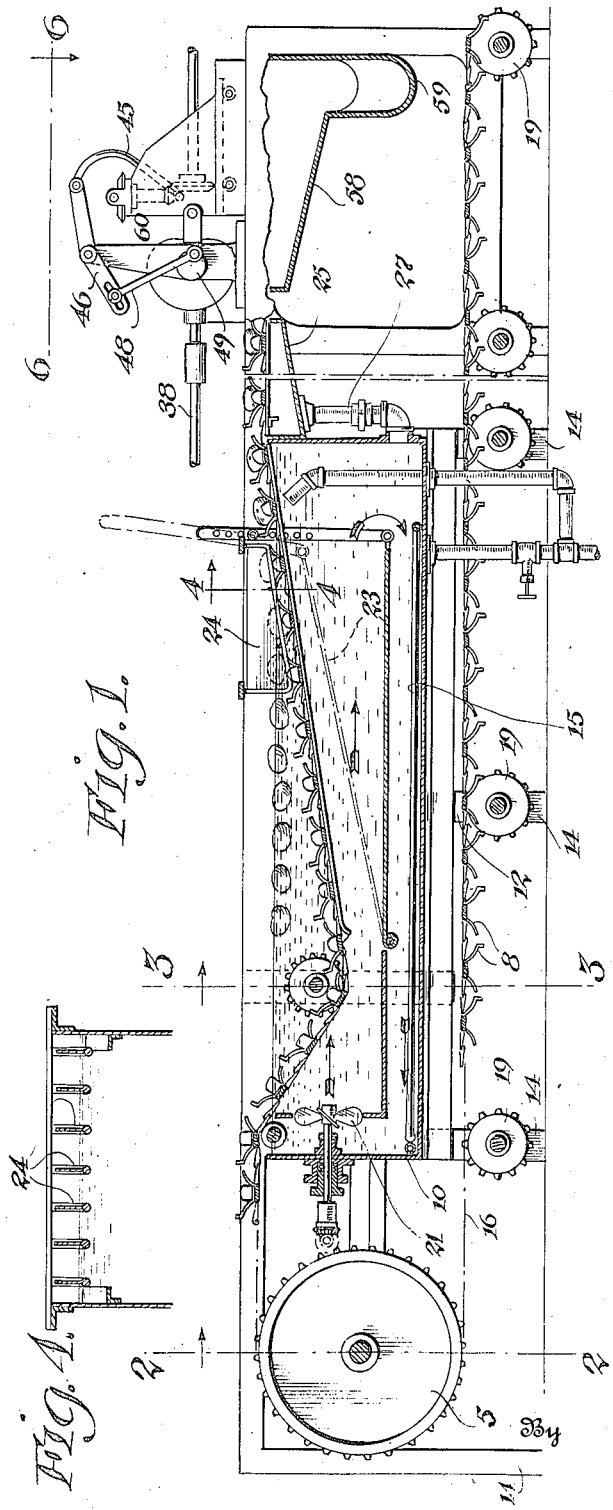
Inventor
H. R. HARDING.
By Eugene C. Brown
Attorney Mar. 13, 1923.
H. R. HARDING.
MACHINE FOR SKINNING AND CORING TOMATOES.
FILED SEPT. 12, 1922.
1,448,532.
11 SHEETS—SHEET 2.
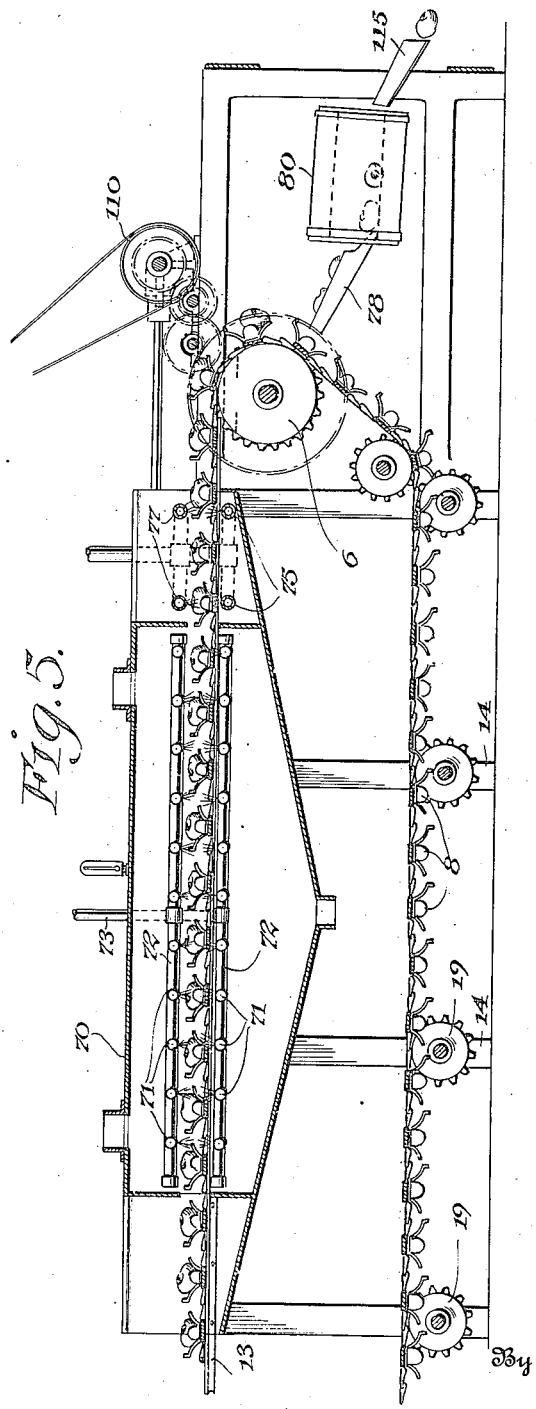
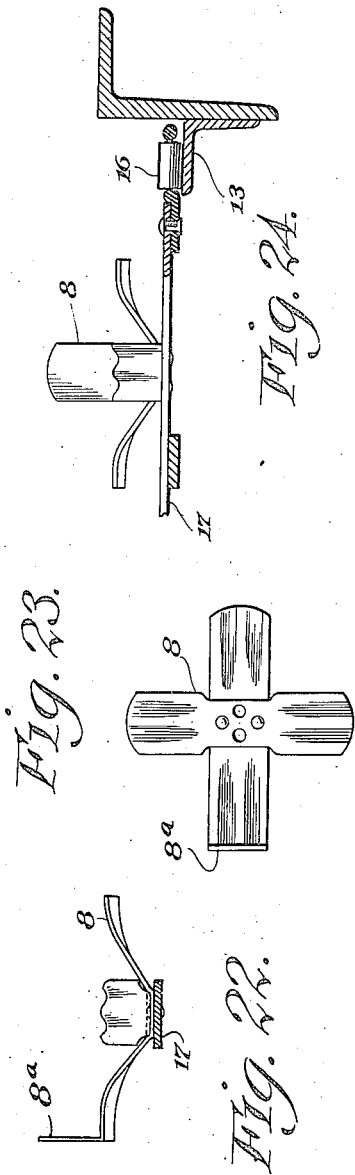
Inventor
H. R. HARDING.
By Eugene E. Brown
Attorney

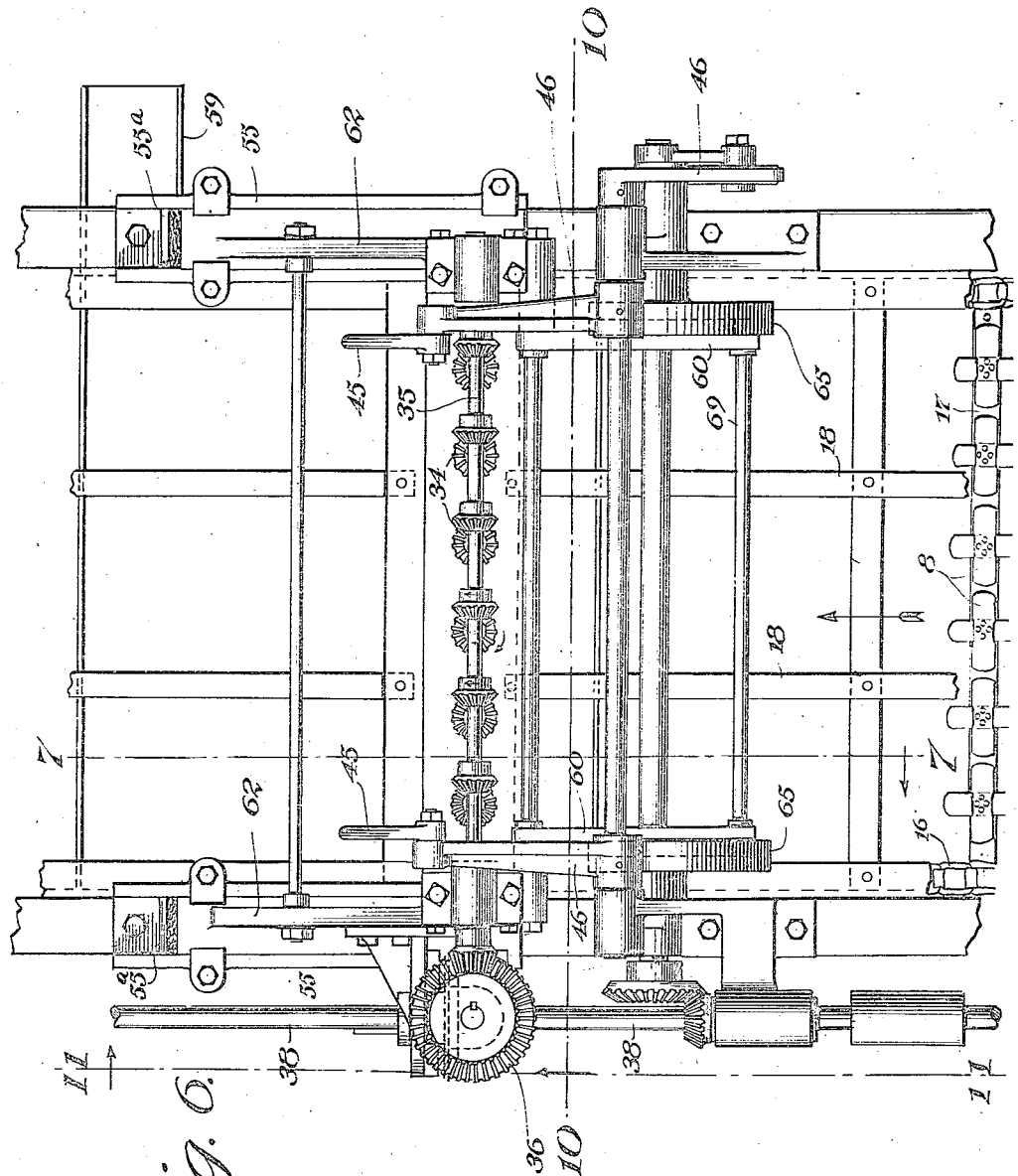

Mar. 13, 1923.
H. R. HARDING.
MACHINE FOR SKINNING AND CORING TOMATOES.
FILED SEPT. 12, 1922.
1,448,532.
11 SHEETS—SHEET 4.
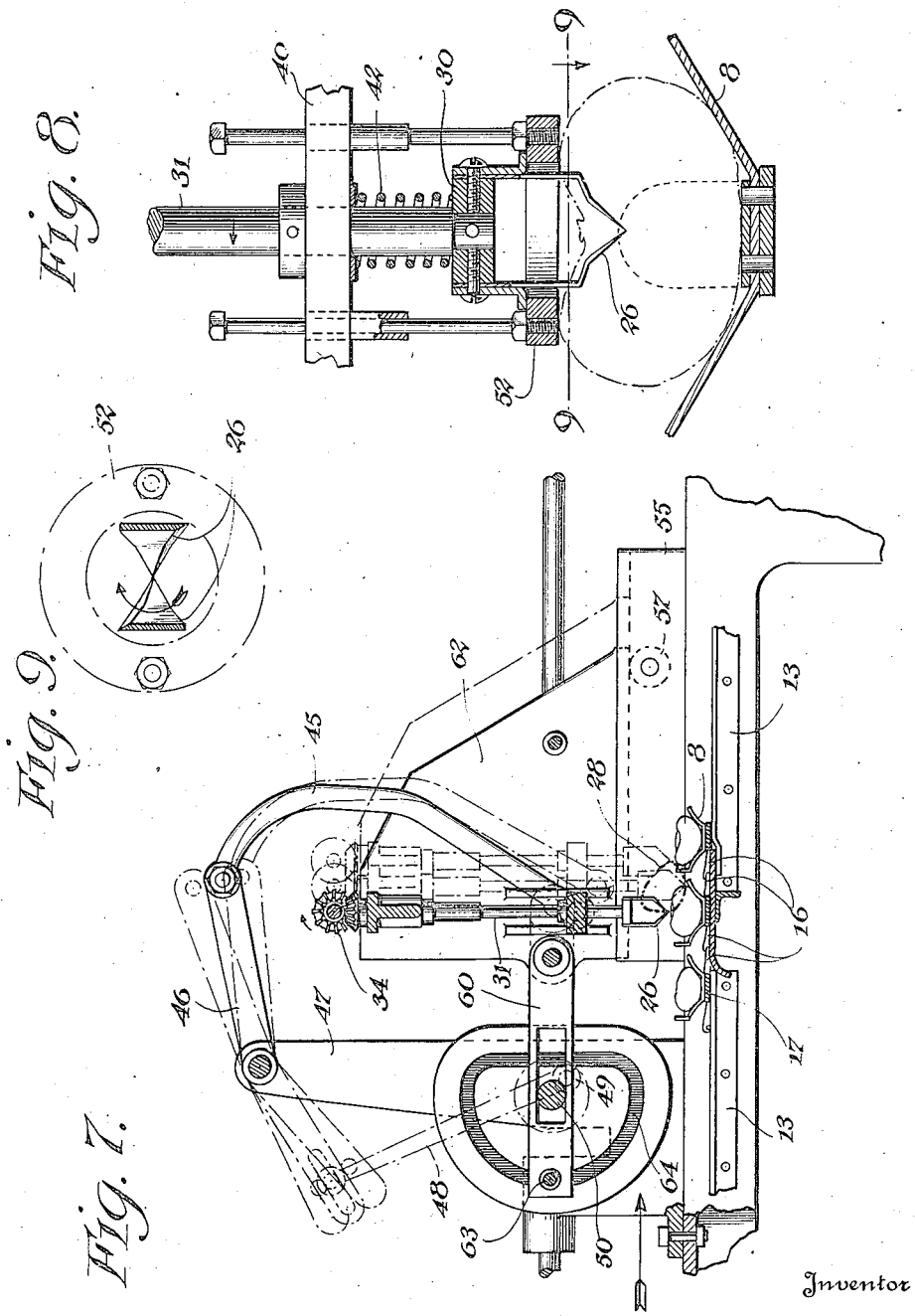
Inventor
H. R. HARDING.
By Eugene C. Brown
Attorney

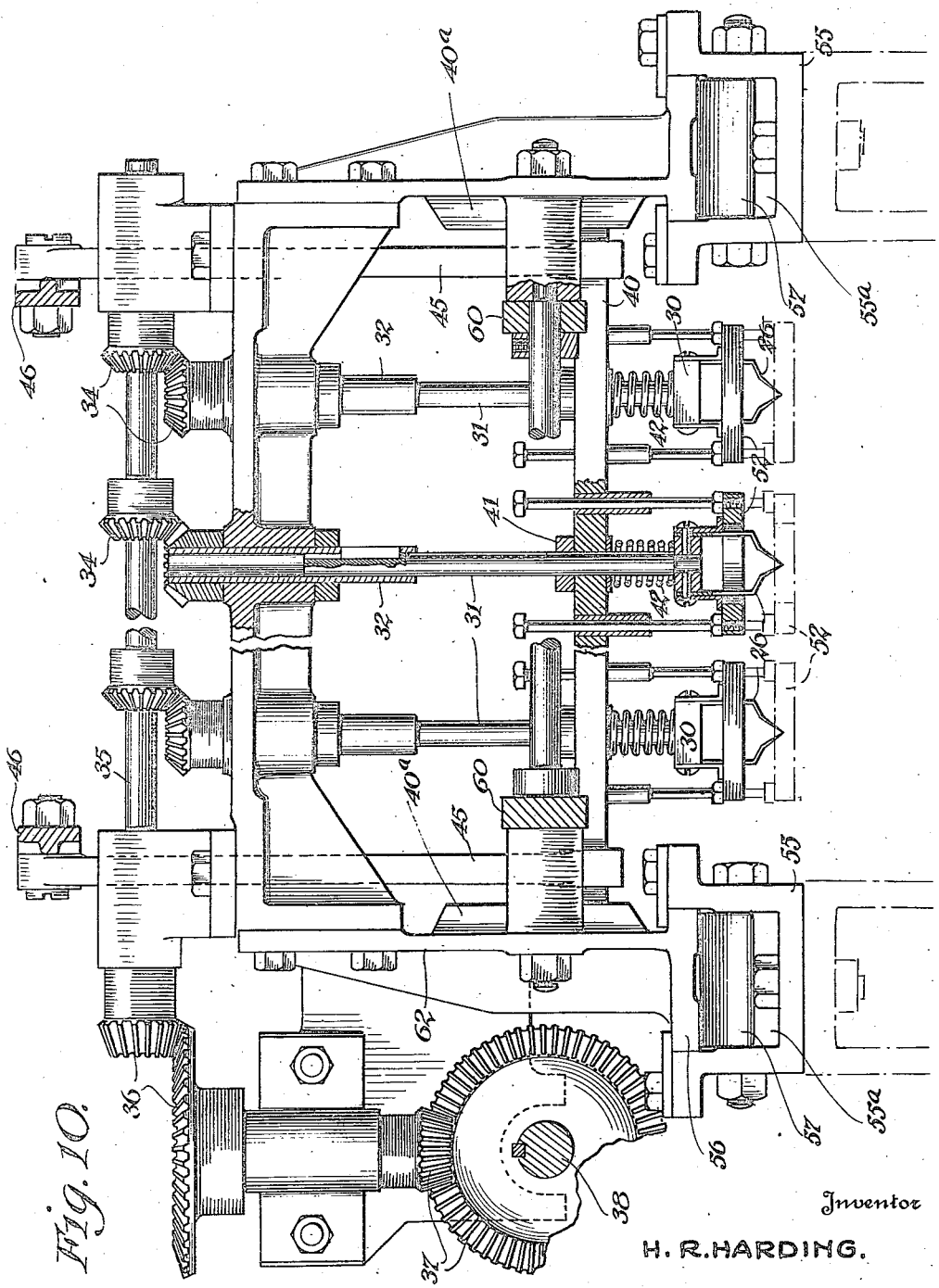

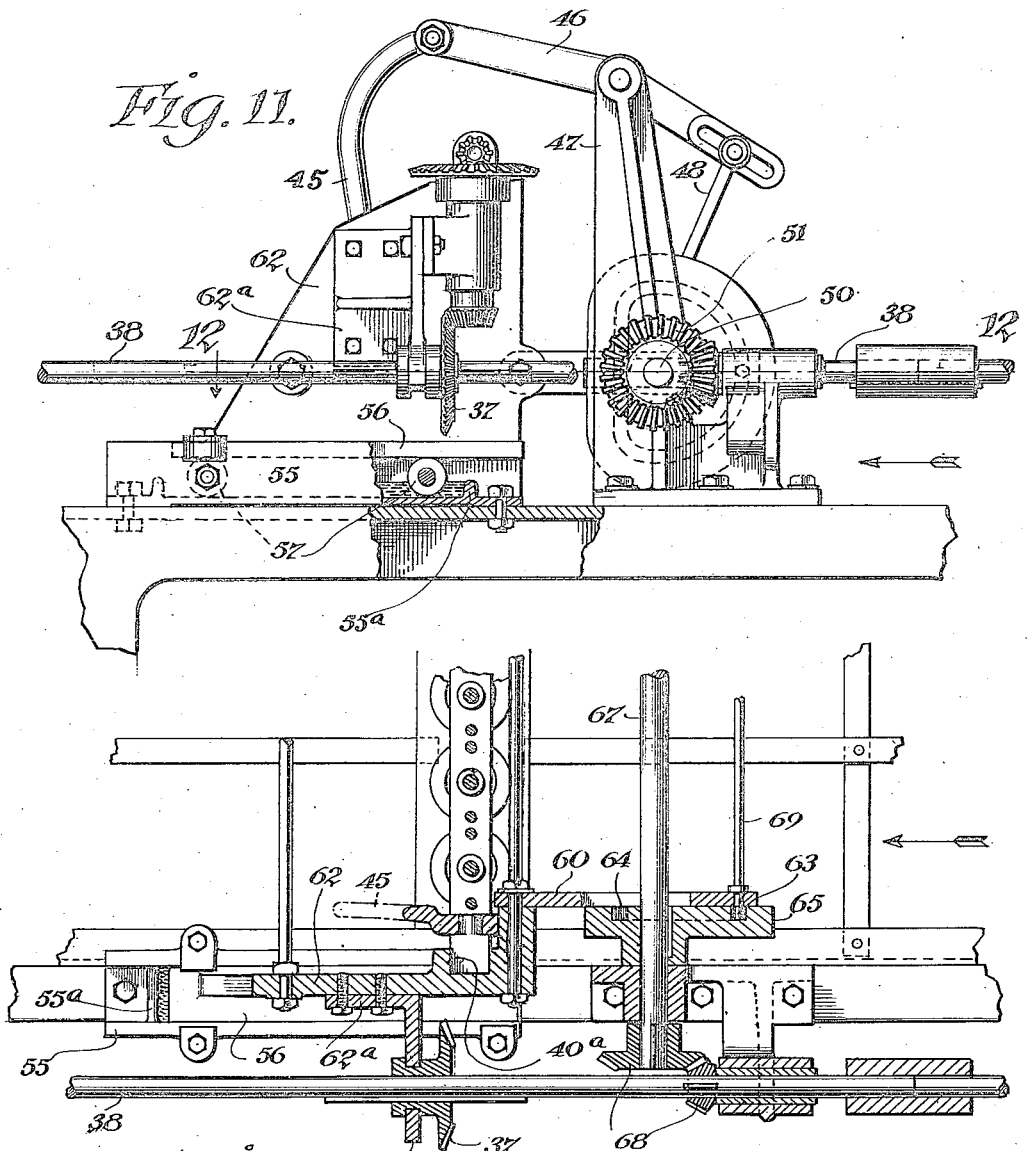

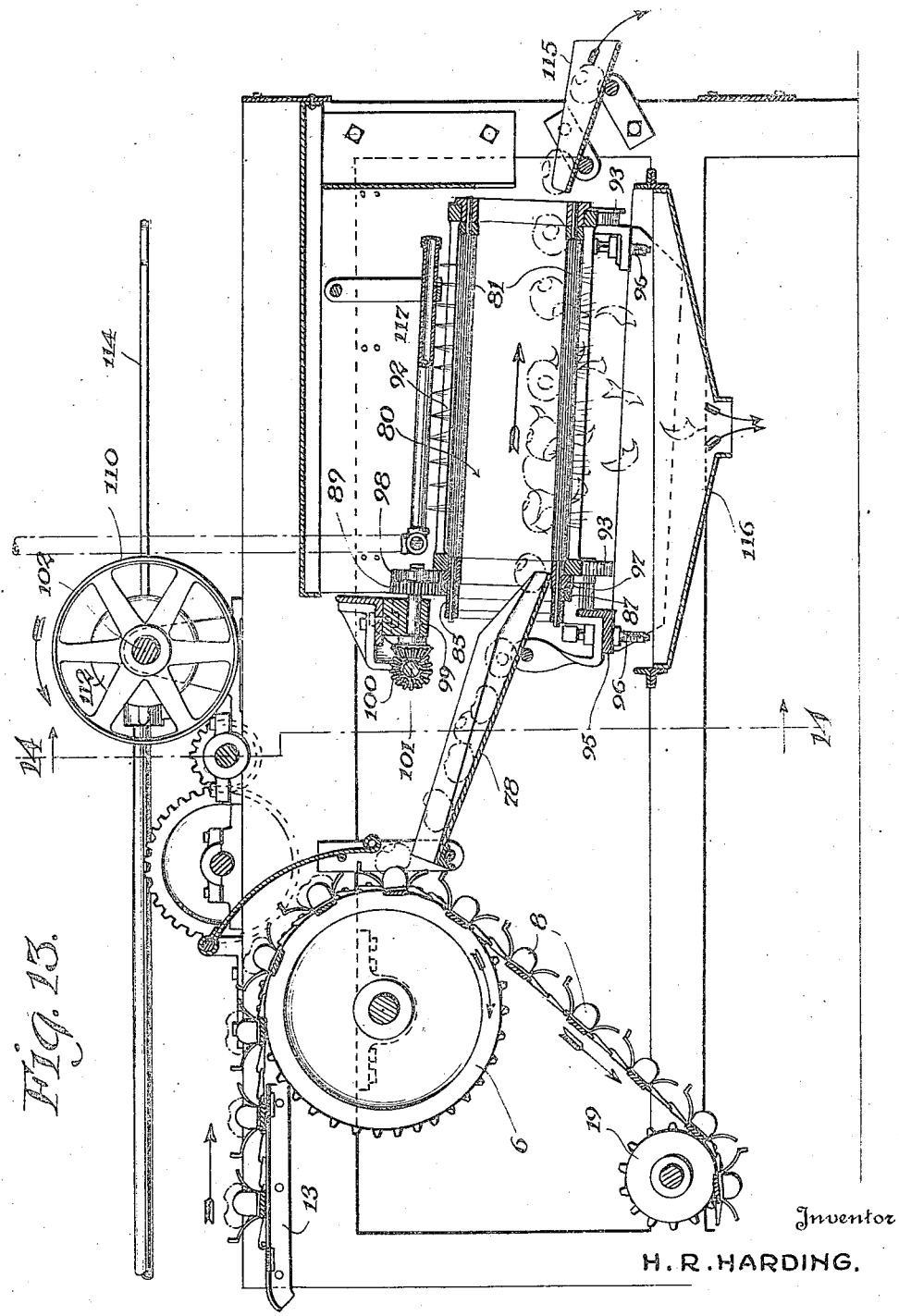

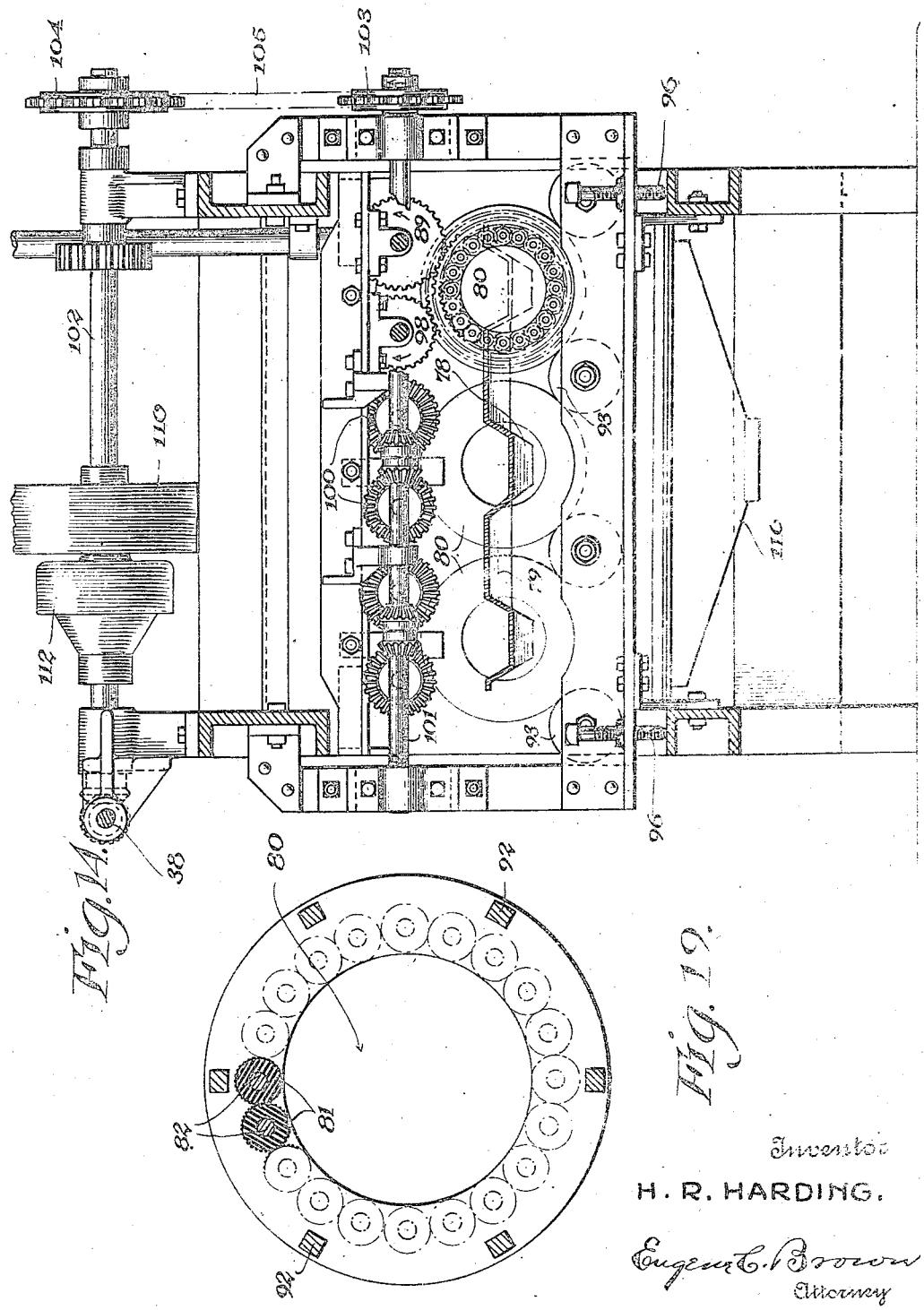

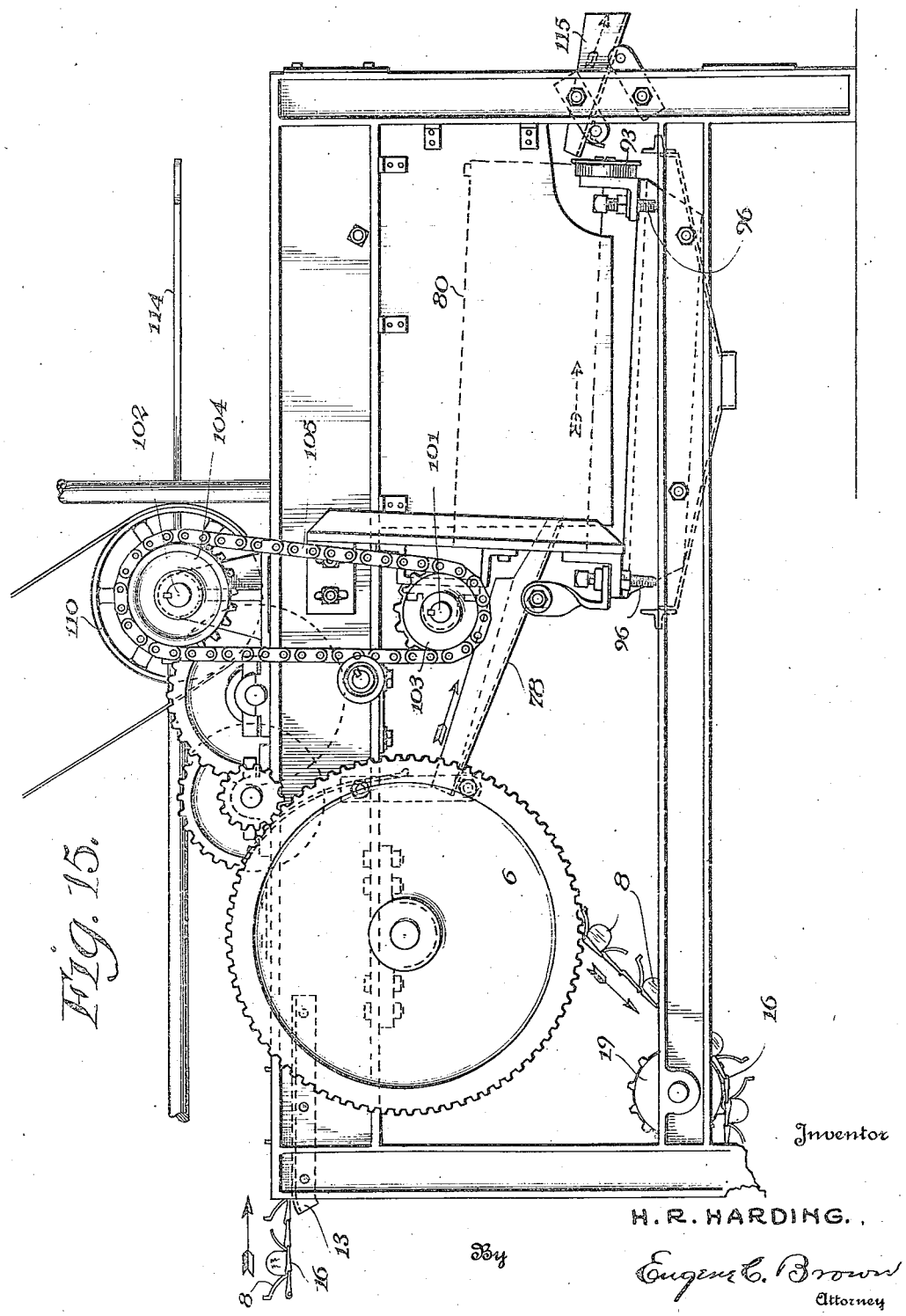

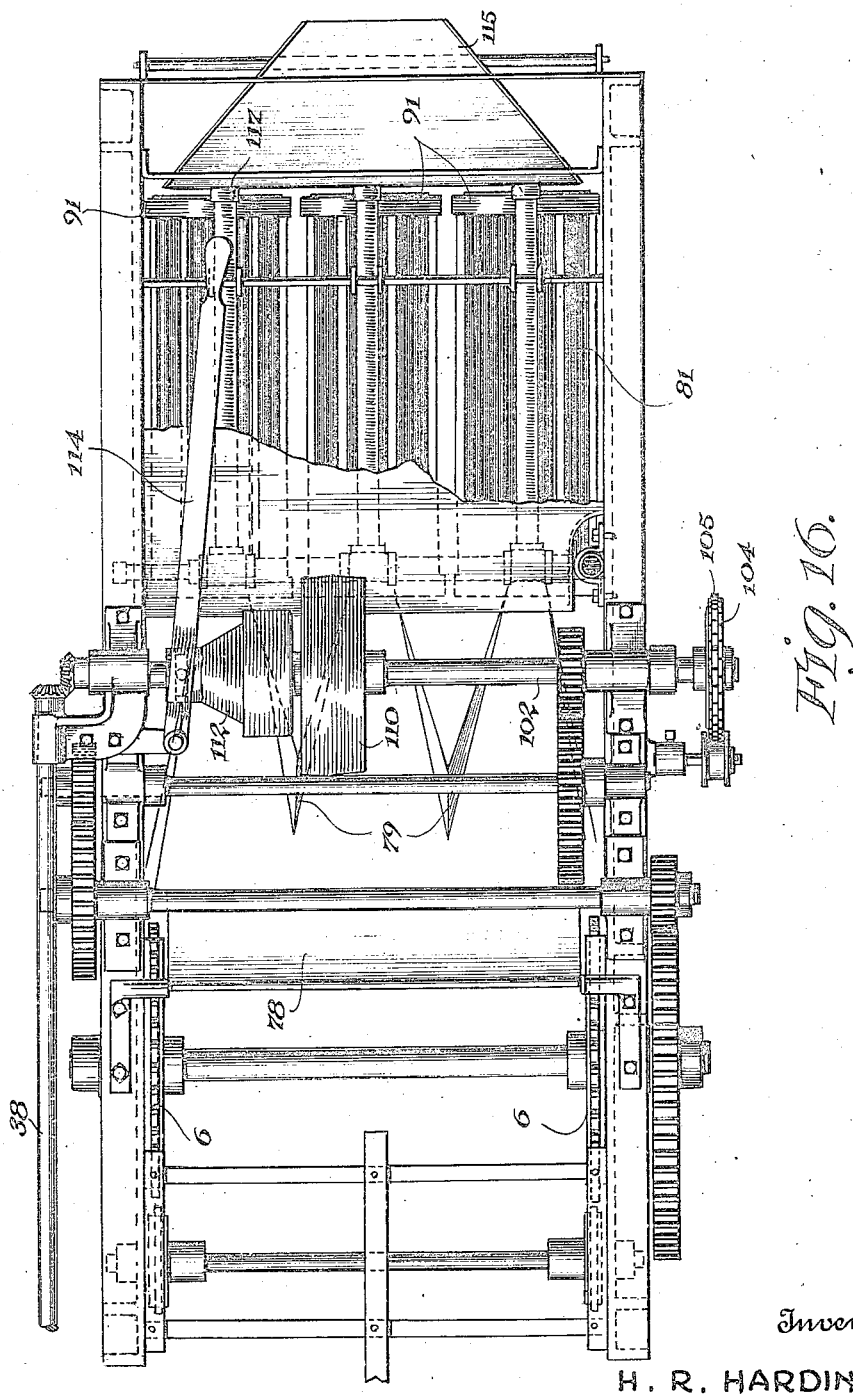

Mar. 13, 1923.
H. R. HARDING.
MACHINE FOR SKINNING AND CORING TOMATOES.
FILED SEPT. 12, 1922.
1,448,532.
11 SHEETS—SHEET 11.
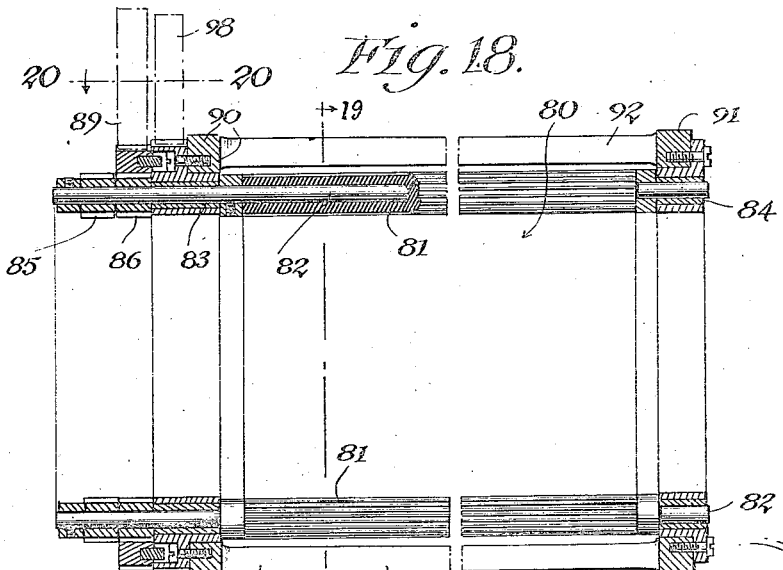
Fig. 18.
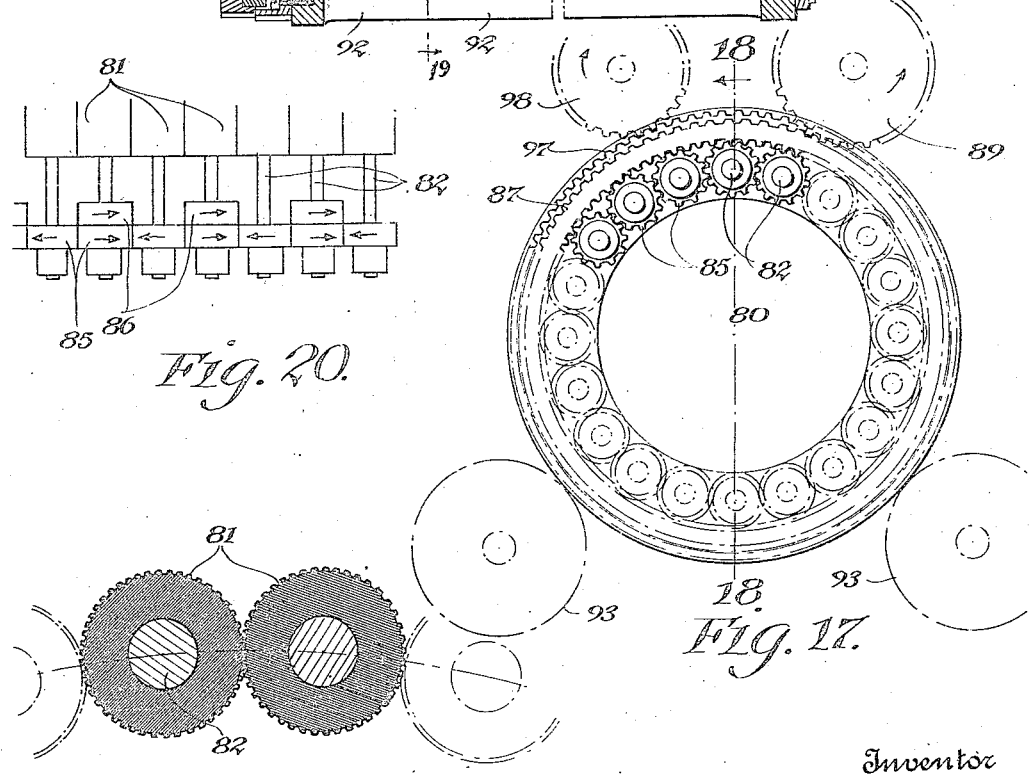
Fig. 20.
Fig. 17.
Fig. 21.
Inventor
H. R. HARDING.
Eugene E. Brown
Attorney Patented Mar. 13, 1923.

1,448,532

UNITED STATES PATENT OFFICE.

HIRAM R. HARDING, OF WILMINGTON, DELAWARE, ASSIGNOR TO THE HARDING PEELING MACHINE COMPANY, INC., OF WILMINGTON, DELAWARE, A CORPORATION OF DELAWARE.

MACHINE FOR SKINNING AND CORING TOMATOES.

Application filed September 12, 1922. Serial No. 587,778.

*To all whom it may concern:*

Be it known that I, HIRAM R. HARDING, a citizen of the United States, residing at Wilmington, in the county of New Castle and State of Delaware, have invented certain new and useful Improvements in Machines for Skinning and Coring Tomatoes, of which the following is a specification.

This invention relates to apparatus for removing the cores and skins of fruits and vegetables preparatory to canning them. The present improvements pertain to the type of machines covered by my prior U. S. Patents Nos. 1,356,447 dated October 19, 1921 and 1,423,421, dated July 18, 1922 for skinning and coring tomatoes.

In the machines covered by my said prior patents, the pulp of the tomatoes is sliced and forced through the meshes of a wire conveyor belt while the purpose of my present improvement is to remove only the cores and skins leaving the tomatoes whole and in their original form and shape.

In the following description of the mechanism employed I shall refer to the accompanying drawings in which Figure 1 is a longitudinal sectional view of the forward portion of my machine showing the washing and separating tank and the coring mechanism; Figs. 2, 3 and 4 are vertical sections on the lines 2—2, 3—3, and 4—4, respectively of Fig. 1; Fig. 5 is a longitudinal sectional view of the rear portion of my machine, showing the scalding and the skinning mechanisms; Fig. 6 is a top plan view of the coring mechanism looking down upon the portion indicated by the line 6—6 of Fig. 1; Fig. 7 is a vertical section on the line 7—7 of Fig. 6; Fig. 8 is an enlarged detail sectional view of one of the coring devices; Fig. 9 is a section on the line 9—9 of Fig. 8; Fig. 10 is a vertical transverse sectional view on the line 10—10 of Fig. 6; Fig. 11 is a side elevation, partly broken away, on the line 11—11 of Fig. 6; Fig. 12 is a transverse sectional view on the line 12—12 of Fig. 11; Fig. 13 is a central longitudinal sectional view of the rear end of the machine; Fig. 14 is a vertical sectional view on the line 14—14 of Fig. 13; Fig. 15 is a side elevation of the rear end of the machine shown in Fig. 13; Fig. 16 is a top plan view of Fig. 15; Fig. 17 is a front elevation of one of the skinning drums; Fig. 18 is a vertical sectional view on the line 18—18 of Fig. 17; Fig. 19 is a vertical sectional view on the line 19—19 of Fig. 18; Fig. 20 is a diagrammatic view taken on the line 20—20 of Fig. 18; Fig. 21 is an enlarged detail sectional view of the corrugated rollers of the skinning drums; and Figs. 22, 23 and 24 are detail views showing the construction and manner of fastening the tomato cups.

My machine is adapted to carry on the several operations in continuous succession, the fruit being conveyed successively from one mechanism to the next by an endless conveyor which passes over drums 5 and 6 at either end of the machine and to which are secured the rows of cups 8 which carry the tomatoes.

The tomatoes are initially washed, heated or partially scalded and automatically inserted in the conveyor cups with their stems upward by means of the apparatus illustrated in Fig. 1 which comprises a vat or tank 10 supported upon cross bars 12 extending between the uprights or standards 14 of the frame. The water in the tank is heated in any suitable manner, as by means of one or more perforated pipes 15 connected with a source of steam supply. The continuous conveyor, which comprises a sprocket chain 16 upon either side connected by transverse strips 17 reinforced by a plurality of parallel longitudinally extending strips or bands 18 riveted to the transverse strips, the latter carrying the cups 8 which are equally spaced, passes downwardly into the vat and then obliquely upward until it gradually emerges from the water. As shown in Figs. 22 and 23, each cup consists of two strips crossed and riveted to the transverse strips of the conveyor, the strips which form the cups being curved or bent upwardly at each side to form cup-shaped recesses, the one which forms the rear of the cup being bent up at 8ᵃ to insure the proper seating of the tomatoes as they are gathered from the tank.

As the tomatoes are emptied into the vat or tank, they rise to the surface of the water with their stems uppermost and are caused to float toward the rear of the tank by the circulation of the water produced by a propeller 21. The velocity of the water is regulated to correspond with the speed of the conveyor belt by adjusting the height of the hinged end of the diaphragm 23. In this manner the tomatoes are always in position to be gathered by the successive rows of cups as they emerge from the water, the tomatoes being segregated and centered above the cups by a series of partitions 24. The water which drains from the tomatoes as they leave the tank is caught by the pan 25 and drains back into the tank through the pipe 27.

As the conveyor belt brings each successive row of tomatoes under the coring mechanism, the knives or cutters 26 descend quickly so that their points strike the centers of the cores, the knives then continuing to move with the tomatoes in an orbital path, indicated at 28, such that it completely removes the entire core and the surrounding hard green portions of the tomato and then moves quickly upward and backward to its initial position in time to descend upon the next succeeding row of tomatoes. By referring to Figs. 8 and 9 it will be observed that the knives are each formed of a mating pair of blades which converge downwardly and inwardly until they meet at a point, being so shaped that they conform in outline to the core and portions of the tomato which are removed.

The knives or cutters are each carried on a head 30 secured to the lower end of a stem 31 which telescopes at its upper end into a hollow shaft 32 connected by beveled gears 34 with the transverse shaft 35, the latter being connected through gears 36 and 37 with a driving shaft 38 connected with the driving motor. In this manner the knives are constantly rotated at a high rate of speed. The knives are periodically moved downwardly by means of a crosshead 40 which is normally pressed upwardly against fixed collars 41 on the stems 31 by springs 42 which bear at their lower ends against the heads 30. The outer ends of the cross-head 40 are connected by curved links 45 with walking beams 46 carried by standards 47, the opposite ends of the beams being connected by links 48 with eccentrics 49 on the shafts 50, the latter being connected through gearing 51 with the drive shaft 38. The oscillations of the beams 46 cause the cross-head 40 to move downwardly in the ways 40$^a$ and compress the springs 42 against the heads 30, thereby causing the cutter knives to descend upon the cores of the tomatoes. The guard or presser rings 52 which surround the knives are normally in advance of the latter, in the position indicated by dotted lines in Fig. 10, but they yield upwardly as the knives descend so that various sizes of tomatoes may be accommodated. The rings 52 serve to steady the tomatoes and maintain them in proper position during the coring operation, and also constitute stops to limit the downward movement of the cutters. The cores are thrown out by centrifugal force from the rapidly rotating knives, falling into the refuse pan 58 and passing out of the discharge spout 59.

The lateral movement or component of the orbital motion of the cutters is effected by a sliding carriage 56 upon which the cutters and their driving mechanism are mounted. This carriage is slid to and fro upon the rollers 57, by means of links 60 pivoted to the standards 62 at their inner ends and carrying pins 63 at their outer ends which move in cam slots 64 in cam disks 65 splined to shaft 67, geared at 68 to the drive shaft 38. The rollers are mounted upon bolts passing through the walls of channel members 55, which are provided at each end with ribs 55$^a$ in their bottom walls to form oil pans into which the rollers dip. The opposite pins or studs 63 may be connected by a cross rod 69. To permit the sliding movements of the carriage 56 and standards 62, the gear 37 carried by the bracket 62$^a$, is splined to the shaft 38 so that it may slide to and fro thereon. The size and shape of the cam slots 64 are so coordinated with the walking beam 46 that their combined movements will produce the desired orbital movement of the cutters for the purpose previously explained.

The cored tomatoes are then conveyed through the steam scalder 70 in which the tomatoes are subjected to oppositely directed jets of steam issuing from the perforated branch pipes 71, connected by manifolds 72 with the steam supply pipe 73. As they emerge from the steam jacket, the tomatoes pass between jets of water issuing from the pipes 75, which cool them and loosen the skins.

After leaving the scalder the conveyor belt passes around the end drum 6 and as the cups are tilted, the tomatoes fall into an inclined chute 78 and are guided by the baffles or partitions 79 into the skinning drums 80. These drums comprise an annular series of fluted or corrugated rollers the teeth of which intermesh, as shown in Fig. 21. The rollers 81 are preferably formed of rubber mounted upon steel axles 82, which are revoluble in bearings 83, 84 and are provided with pinions 85, which intermesh. Every alternate axle also carries a pinion 86 which is engaged by the internal teeth of a gear ring 87, also having external teeth meshing with a driving gear 89. By this arrangement adjacent rollers rotate in opposite directions. Rings 90 and 91 surround the bearings at either end of the drums and are connected by a series of spaced bars 92 forming a cage.

The drums are revolubly mounted upon disk rollers 93 which engage the rings 90 and 91, the rollers being carried by a frame 95 which may be inclined to the desired angle by adjustable supporting bolts 96.

The drums are provided with gear rings 97 secured to the rings 90 and which mesh with driving gears 98. In this manner the drums may be rotated slowly upon their horizontal axes while the corrugated rollers around the periphery are rotated at a high rate of speed. The gears 89 and 98 are carried by short shafts 99 which are geared at 100 to shaft 101, the latter being connected to the main power shaft 102 by means of sprockets 103, 104 and sprocket chain 105.

The belt pulley 110 which is connected to the engine or driving motor, is connected to the shaft 102 by means of a clutch 112, controlled by the shift lever 114. The upper reach of the sprocket chains of the conveyor are supported upon trackways or ledges formed by angle irons 13 secured to the frame supports, while upon the lower reach the chains pass over sprocket wheels 19.

The cored and scalded tomatoes pass from the conveyor through the chute 78 into the skinning drums in the manner indicated in Fig. 13. As previously pointed out, these drums slowly revolve so that the tomatoes are tumbled about and are caused to take a zigzag or serpentine path as they move through the drums and pass out into the delivery chute 115. The skins have been previously loosened as the tomatoes passed through the steam scalder and chilling sprays and consequently as soon as they begin to roll about over the rapidly rotating corrugated rollers, which rotate in pairs in opposite directions, the skins are pinched and quickly snatched from the tomatoes, passing out between the rollers and falling into the waste pan 116. This action is facilitated by streams of water issuing from a series of perforated pipes 117 located above the drums which not only cleanses the rollers but also produces a suction as it passes out between the intermeshing ribs of the corrugated rollers.

From the above description, it will be seen that I have devised an organized mechanism which automatically subjects each tomato individually to a series of operations which results in removing the core and skin, leaving the pulp intact in its original form and shape. Each tomato is carried from the washing tank in an individual holder or receptacle which maintains it in proper position with the stem uppermost while being subjected to the coring, scalding and chilling or skin loosening operations. The mechanism for slipping the skins from the pulp operates with such deftness and with such rapidity that the pulp or meat remains absolutely uninjured and the tomatoes are delivered in perfect whole condition.

I claim:—

1. An organized mechanism for removing the core and skin from tomatoes while maintaining the pulp whole, comprising a washing tank, means to segregate the tomatoes with their cores uppermost, means to remove the cores, means to loosen the skins, means to remove the skins while leaving the pulp whole, and means to convey the individual tomatoes from the tank and present them separately in succession to said several means in a continuous operation.

2. An organized mechanism for removing the core and skin from tomatoes while maintaining the pulp whole, comprising means to segregate and arrange the tomatoes in aligned series with their cores uppermost, means to remove the cores while maintaining the pulp whole and intact, means to loosen the skins, means to remove the skins, and a conveyor having separate receptacles to receive the individual tomatoes and to present them successively to said several means.

3. In a machine for removing the cores and skins from tomatoes, a coring mechanism, comprising a cutter, means for continuously rotating it, means for conveying tomatoes beneath said cutter, and means for moving said cutter in an orbital path, whereby the cores may be removed during their continuous movement.

4. In a machine for removing the cores and skins from tomatoes, a coring mechanism, comprising a cutter, means for continuously rotating it, means for conveying tomatoes beneath said cutter, and means causing said cutter to descend upon the tomatoes successively and to move laterally therewith during the coring operation.

5. In a machine for removing the cores and skins from tomatoes, a coring mechanism, comprising a cutter, means for continuously rotating it, means for conveying tomatoes beneath said cutter, means for moving said cutter in an orbital path, whereby the cores may be removed during their continuous movement and yieldable means to hold and position the tomatoes while the core is being removed.

6. In a machine of the type described, a skinning mechanism comprising a rotatable drum having an annular series of rollers constituting the shell of the drum, and means for rotating adjacent rollers in opposite directions.

7. In a machine of the type described, a skinning mechanism comprising a rotatable drum having an annular series of rollers constituting the shell of the drum, means for rotating adjacent rollers in opposite directions, and means for rotating the drum.

8. In a machine of the type described, a skinning mechanism comprising a rotatable drum having an annular series of corrugated or ribbed rollers constituting the shell of the drum and means for rotating adjacent rollers in opposite directions.

9. In a machine as set forth in claim 8, means for projecting streams of water upon said rollers.

10. In a machine of the type described, a skinning mechanism comprising a rotatable drum having an annular series of corrugated rollers constituting the shell of the drum, the corrugations of adjacent rollers intermeshing, and means for rotating adjacent rollers in opposite directions.

11. An organized mechanism for removing the core and skin from tomatoes while maintaining the pulp whole, comprising a scalding tank, means to remove the skins, cutting means to remove the cores while maintaining the pulp whole and intact, and conveyor mechanism operating to present the tomatoes to said several means in a continuous operation.

12. In a machine as set forth in claim 11, said coring means comprising cam mechanism operating to cause the cutter to traverse an orbital path.

13. In a machine as set forth in claim 11, said coring means comprising cam mechanism operating to cause the cutter to traverse an orbital path, and to rotate the cutter during the cutting operation.

14. An organized mechanism for coring tomatoes, comprising cutting means to remove the cores while maintaining the pulp whole and intact, means for conveying the tomatoes continuously during the coring operation, and means for causing said cutting means to traverse an orbital path relatively of the conveyor.

In testimony whereof I affix my signature.

HIRAM R. HARDING.